Oct. 9, 1945.　　　　　E. F. HESSELMAN　　　　　2,386,550
MECHANISM FOR FORMING TUBULAR RIVETS
Filed Oct. 26, 1943　　　　5 Sheets-Sheet 1

INVENTOR
EDWARD FRANZ HESSELMAN
BY
ATTORNEY

Oct. 9, 1945. E. F. HESSELMAN 2,386,550
MECHANISM FOR FORMING TUBULAR RIVETS
Filed Oct. 26, 1943 5 Sheets-Sheet 2
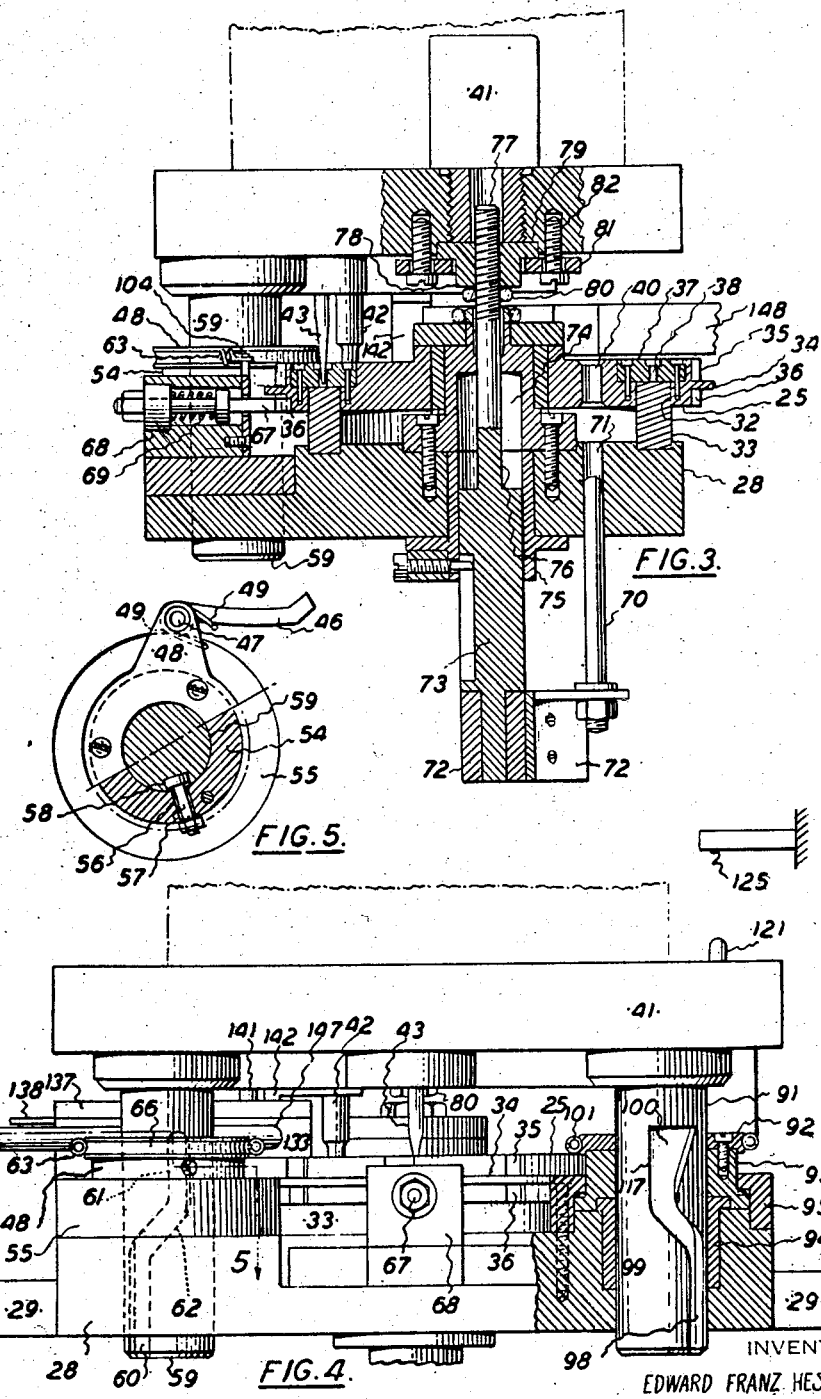

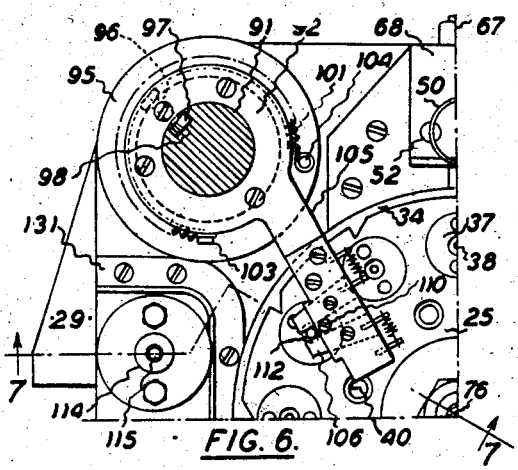
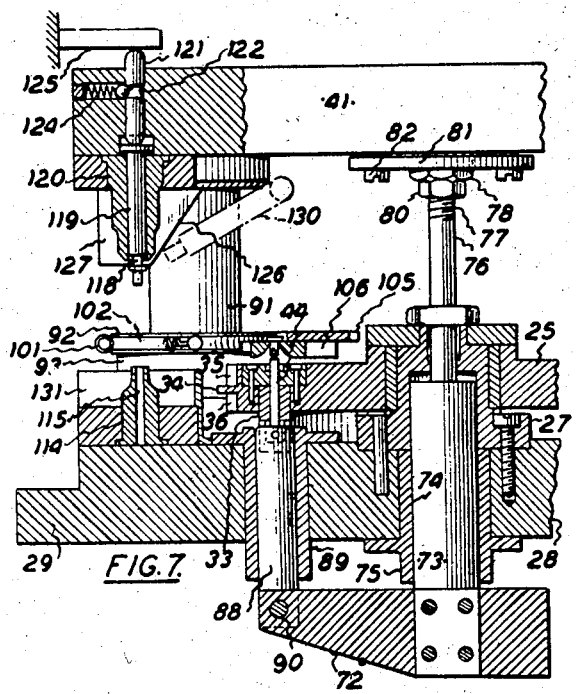

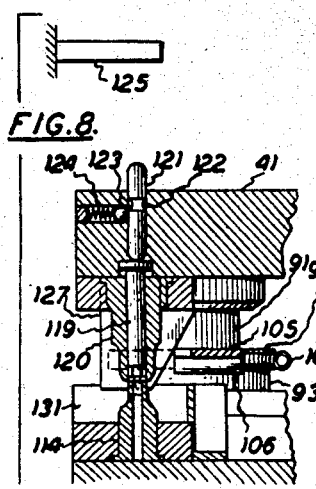
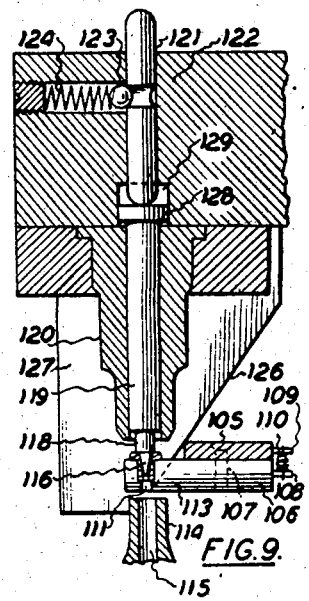
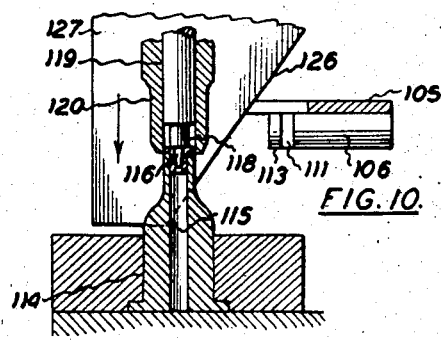
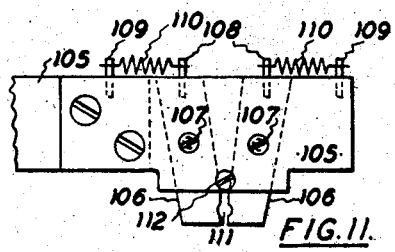
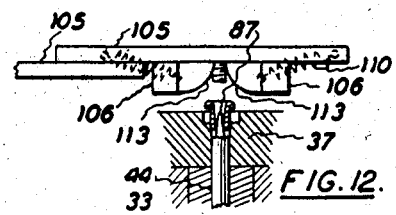
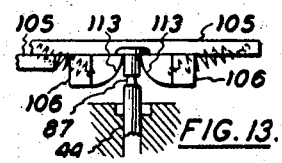

Oct. 9, 1945.   E. F. HESSELMAN   2,386,550
MECHANISM FOR FORMING TUBULAR RIVETS
Filed Oct. 26, 1943   5 Sheets-Sheet 5
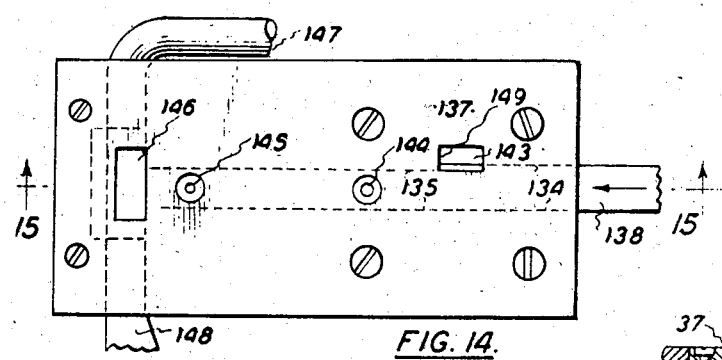
FIG. 14.
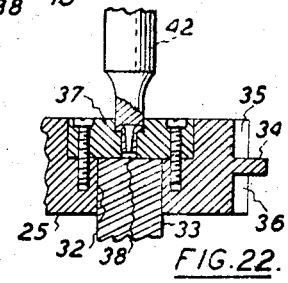
FIG. 22.
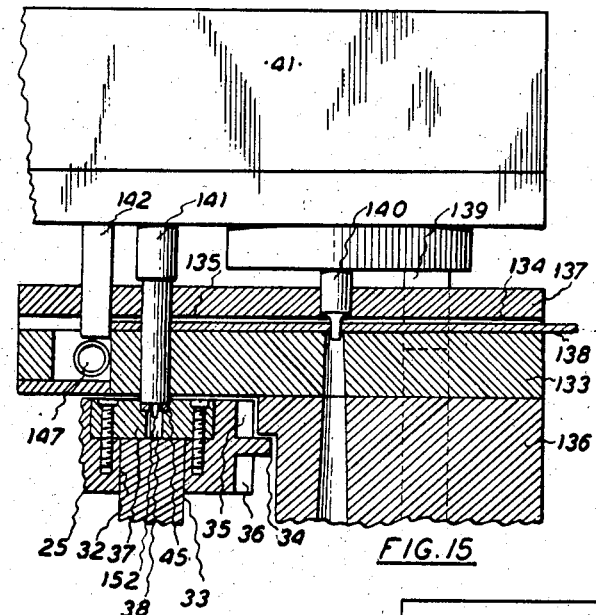
FIG. 15.
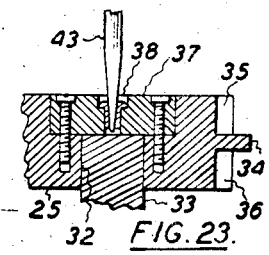
FIG. 23.
FIG. 24.
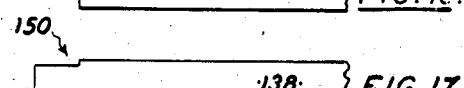
FIG. 16.
FIG. 17.
FIG. 18.
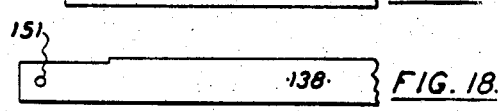
FIG. 19.
FIG. 20.
FIG. 21.
INVENTOR
EDWARD FRANZ HESSELMAN
BY
ATTORNEY Patented Oct. 9, 1945

2,386,550

UNITED STATES PATENT OFFICE 2,386,550

MECHANISM FOR FORMING TUBULAR RIVETS

Edward Frans Hesselman, Wahroonga, near Sydney, New South Wales, Australia, assignor to Hartford National Bank and Trust Company, as trustee Application October 26, 1943, Serial No. 507,700
In Australia October 27, 1942

3 Claims. (Cl. 10—13)

This invention has been devised with the object of providing mechanism whereby tubular rivets may be rapidly formed in large quantities, for example out of strip aluminium, copper, or other more or less plastic metal or metal alloy. Examples of the kind of rivet adapted for manufacture by the mechanism subject hereof, are those described and illustrated in the complete specification of British Patent No. 490,047, dated January 6, 1937.

Mechanism according to this invention is applicable to, or may be partly constituted by, a common punching press of the kind having a stationary work-table and a slide, ram or head which is reciprocatable in a direction at right angles to the surface of the table.

The mechanism subject hereof mainly comprises one or more male punches fixed on a reciprocatable punching press head, a female die assembly mounted on a press work-table consisting of a rotatable platen and a plurality of female die elements in said platen, and means responsive to reciprocating movements of said head for intermittently part-rotating the platen so that said female die elements are consecutively registered with the male punch or punches.

An example of the invention is illustrated in the accompanying drawings.

Fig. 3 is a sectional elevation taken on the planes indicated by line 3—3 in Fig. 1. In this view the punch assembly is shown at the lower limit of its movement range.

Fig. 4 is a rear elevation (partly sectioned) taken on the planes indicated by line 4—4 in Fig. 1, with the punch assembly fully descended as in Fig. 3.

Fig. 5 is an incomplete sectional plan taken on line 5—5 in Fig. 4.

Fig. 6 is an incomplete plan of the female die assembly and parts related thereto. The positions of the several parts in this view are those which correspond with the reciprocatable punch-head being in or near the top end of its upstroke or downstroke.

Fig. 7 is a sectional elevation taken on the planes indicated by line 7—7 in Fig. 6.

Fig. 8 is a sectional detail view which repeats a portion of Fig. 7 with the parts positioned in correspondence with the punch-head being fully descended.

Fig. 9 repeats a portion of Fig. 8 but with the parts positioned as they are just prior to arrival in the positions shown in Fig. 8.

Fig. 10 repeats a portion of Fig. 8 on a larger scale for clearness.

Figs. 11 and 12 are detail plan and front elevation respectively of a rivet holding device forming part of the machine.

Fig. 13 repeats Fig. 12 but with the parts positioned as they are just after leaving the positions shown in Fig. 12.

Figure 2:
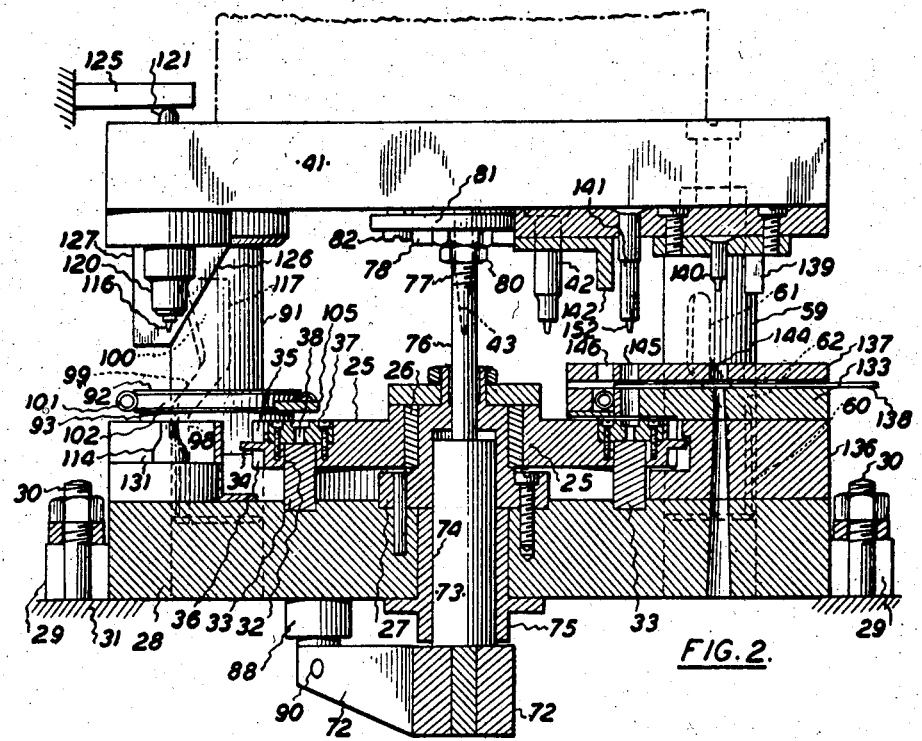
Fig. 2 is a sectional elevation, including the punch assembly, and taken on the plane indicated by line 2—2 in Fig. 1. In this view the punch assembly is at the upper limit of its movement range.
Figure 1:
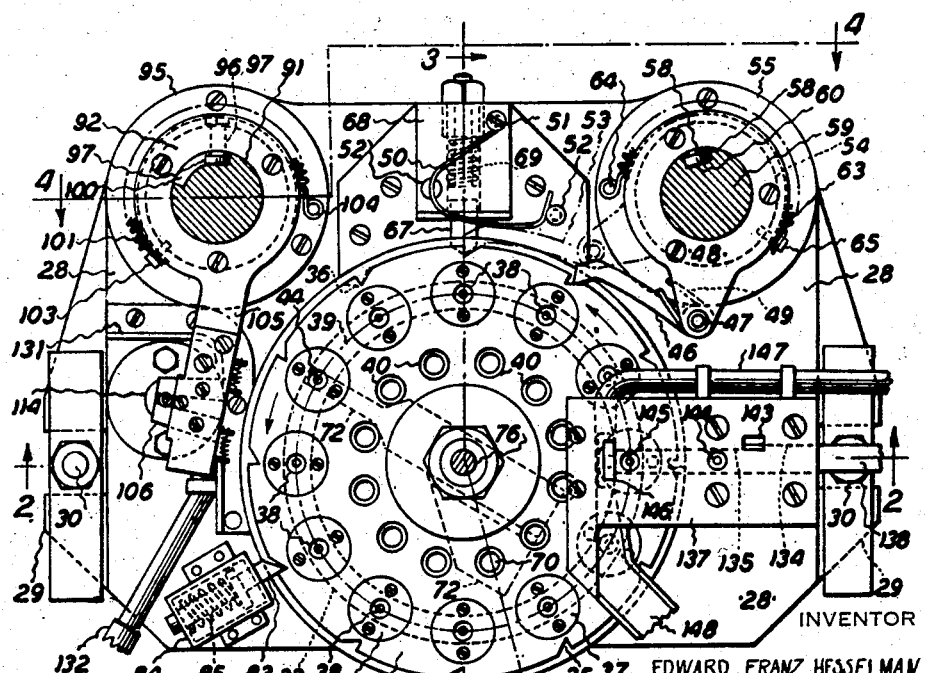
Fig. 1 is a plan of a female die assembly (the reciprocatable head or punch assembly being omitted). The positions of the several parts in this view are those which correspond with the reciprocatable head being almost at the end of its down or working stroke.

Fig. 14 is a plan of a follow-die illustrated in association with the machine platen in Figs. 1 and 2.

Fig. 15 is a sectional elevation taken on the plan indicated by line 15—15 in Fig. 14. The punch assembly is included and is shown fully descended.

Figs. 16 to 20 show the progressive changes in the formation of rivet blanks from strip stock by the follow-die shown in Figs. 14 and 15.

Fig. 21 illustrates a rivet blank produced by the follow-die.

Fig. 22 is a detail view illustrating a step in the formation of a rivet in and by a female die and by a forming punch.

Fig. 23 is a similar view in Fig. 22, showing a bore-trueing punch or drift engaging a partly formed rivet in a female die.

Fig. 24 is a section of a finished rivet.

Figs. 1 to 8 are drawn to the same scale, Figs. 9 to 23 are drawn on a somewhat larger scale for clearness, and Fig. 24 is drawn on a still larger scale.

The platen 25 is freely rotatable about a central bearing 26 on a pedestal 27 fixed to a base block 28. The block 28 is adapted for affixture (for example by wings 29 and bolts 30) on the work-table 31 of a common punching press. The platen has a concentric groove 32 in its underface, whereby it seats on a bolster ring 33. The platen is rotarily slidable on the ring 33, the latter being fixed on the base block 28 in concentricity with the bearing 26. The platen has its peripheral edge divided into two parts by a flange 34. Above this flange the platen periphery is furnished with equally spaced ratchet driving notches 35 and below said flange with V halting and locating notches 36. The notches 35 and 36 are referred to later herein.

A plurality of female die elements 37 are inset and fixed in the platen with their top faces flush with that of said platen. Each of these die elements has a central rivet-forming cavity 38 therein, and the axial depth of the elements and the cavities therein is such that the top face of the bolster ring 33 constitutes a floor for said cavities. The cavities 38 are equally spaced about a pitch circle (39—Fig. 1) whereof the centre is coincident with the rotational axis of the platen. The platen is preferably furnished with a plurality of register holes 40 which are equal in number to the female die elements, and like the cavities 38, are arranged as an equally spaced series on a pitch circle whereof the centre is coincident with the rotational axis of the platen.

A punch-head 41 has one or more rivet-forming male punches such as 42 and 43 fixed thereon. The head 41 is reciprocatable, by means of known drive devices, in a direction normal to the plane of the pitch circle 39 (that is, normal to the platen top surface). The range of movement of said head is such that when the head is at the bottom of its stroke, the punch 42 (for example) enters one of the female die elements registered therewith, to the extent illustrated by Fig. 22; and when the head is at the top of its stroke a rivet "knock-out" or lifting rod 44 (Fig. 7) which is fixed relative to said head, enters one of the female die elements, upwardly and from the bottom thereof, to the extent shown in Figs. 7 and 13.

A rivet is formed from a washer-like blank 45 (Fig. 21) within one or other of the female die elements, by the engagement therein of the punches 42 and 43, during each complete stroke cycle of the head 41. The platen is (of course) held stationary with two of its female die elements in axial alignment with the punches 42 and 43, while said punches are at or near the bottom end of their stroke. While said punches are performing the remainder of their stroke cycle, the platen is intermittently part-rotated in order to bring the female die elements consecutively into register with said punches.

The means for intermittently part-rotating the platen are actuated in response to the reciprocatory movements of the punch-head. These means comprise the mentioned ratchet notches 35 and a pawl-lever 46 fulcrumed at 47 on a ring-bracket 48 and loaded to bear against the platen periphery by spring 49. A leaf spring 50 fixed at 51 and held in position by stubs 52, may be provided to impose additional resilient loading on the pawl 46 when it is at or near the end of its work-stroke as shown by chain dotted lines (53) in Fig. 1. The ring-bracket 48 is fixed on a collar 54 which is freely rotatable (but is restrained against axial movement) within a ring bearing 55 fixed on the base block 28. The collar 54 has a radial hole 56 therein which houses a pin 57. A freely rotatable follower roller 58 is mounted on the inner end of pin 57. This roller rides in a cam-groove formed in a post 59 which is fixed on the head 41 and which is freely movable endwise within the bracket 48, the collar 54, and a hole in the base block 28. The mentioned cam-groove consists of upright straight end-portions 60 and 61 and an inclined or helical central portion 62. The arrangement is such that during the first (approximately) one-third portion of the punch-head upstroke, the roller 58 rides in the cam-groove portion 61, and the pawl 46 is thus not moved from the position shown by full lines in Fig. 1; during the second (approximately) one-third portion of the upstroke, the roller 58 rides in the cam-groove portion 62, and the pawl 46 is thereby moved to the position shown chain-dotted in Fig. 1, thus performing its working stroke in turning the platen through the required part-rotation thereof; and during the third and final (approximately) one-third portion of the upstroke the roller 58 rides in the cam-groove portion 60, and the pawl is thus held in the position shown chain-dotted in Fig. 1. During the middle portion of the punch-head down-stroke, the pawl is restored to the full-line position (Fig. 1) in readiness for its next working stroke. It will be noted from the foregoing that part-rotations of the platen are effected and completed during the period that the punch-head is moving through a one-third (approximately) central span of its upstroke, and consequently that the platen is stationary during about five-sixths of the stroke cycle of the punch-head. During these halting periods all the working operations on a rivet blank or on a formed rivet are effected. In order to avoid back-lash inaccuracies due to the follower roller 58 being necessarily a running fit within the cam-groove 60—61—62, the bracket 48 is loaded by a tension spring 63 which is anchored at 64 to the bearing 55, and at 65 to the bracket 48. This spring 63 rides in a peripheral groove 66 in bracket 48 and its effect is to oppose performance of the working stroke of the bracket 48 thereby ensuring that during said working stroke the roller 58 rides hard against the driving side of the cam groove portion 62.

The ratchet pawl and cam devices just described are designed to turn the platen precisely through the correct angle required for the consecutive advances of the female die elements. Means are provided, however, to ensure that the platen is halted in correct position, and is so held until it is due for a next move.

The platen halting and holding means comprise the mentioned halting and locating notches 36 and a chisel-ended plunger 67 which is adapted neatly to home in said notches. The plunger 67 is axially movable within a housing 68 fixed on the base-block 28, and at all times is influenced to move towards the platen centre by compression spring 69. The loading of spring 69 and the angularity of the notches 36 are such as to ensure firm engagement of the plunger in the notches, without preventing the plunger from being displaced from the notches when the platen is part-rotated under compulsion of the pawl 46.

The loaded plunger 67 and the notches 36 may be wholly relied on for halting and holding the platen with its female dies in positions of true register with the punches such as 42 and 43. For preference however, additional registering means are provided by way of precaution. In the illustrated arrangement of the invention such additional means are provided, and they comprise the mentioned holes 40 and a registering plunger 70. This plunger 70 is neatly slidable within any one of the holes 40 and in a hole 71 (see mainly Fig. 3) in the base-block 28. Plunger 70 is fixed on a bracket 72 which in turn is fixed on the bottom end of a push-rod 73. This rod 73 is slidable in a bore 74 partly formed within the pedestal 27 and partly in a sleeve 75 fixed in the base-block 28. The push-rod 73 has an upwardly extending stem 76 whereby it is fixed to the punch-head 41. The stem 76 is preferably threaded (as indicated at 77) for engagement within a nut 78, having a flange 79, and for reception of a lock-nut 80. The nut 78 is secured to the punch-head by a clamping plate 81 and screws 82. On relaxation of screws 82 (and lock-nut 80) the nut 78 may be turned to adjust the effective length of the stem 76. The correct adjustment of the stem 76, and the length of plunger 70, are such that the plunger is well clear of any hole such as 40 whenever the platen is moving. In each stroke cycle of the mechanism, the plunger 70 enters one of the holes 40 shortly after the platen has been part-rotated and shortly before the punch-head finishes its upstroke.

As a further precaution against wrongly located halting of the platen, devices may be present for cleaning the notches 35 and/or the notches 36, prior to each engagement therein of the pawl 46 and/or the plunger 67 respectively. In the illustrated arrangement of the invention, such cleaning means (for the notches 35) comprise (see Fig. 1) an oblique-ended plunger 83 which is endwise slidable in a housing 84 fixed to the base-block 28. The plunger 83 is resiliently loaded to ride in the notches 35 by a compression spring 85. The working end of plunger 83 is preferably more acutely angled than are the notches 35 (as shown). This enables said end to scrape the notch interiors and thus more positively remove unwanted matters therefrom. A similar device to that numbered 83—84—85 may be provided for cleaning the notches 36, and may be installed on that part of the base-block shown in the right-hand bottom corner of Fig. 1.

Rivets are formed in the female die elements 37, by punches such as 42 and 43, out of washer-like blanks such as 45 (Fig. 21) pre-emplaced in said die elements at a selected blank-receiving station. The blank-receiving station may coincide with any one of the halting positions of the elements 37, provided it is one of those positions which is circumferentially ahead of or the same as that position in which the first rivet forming operation occurs, and provided it is one of those positions in which the die element, in the ordinary course of operation, is empty or has been emptied. In the illustrated embodiment of the invention the blank-receiving station corresponds with the "right-most" or "three-o'clock" female die halting position in Fig. 1. Successive emplacement of the blanks in the female dies consecutively halting at the receiving station, may be effected manually or as the end operation of a follow die (described later herein) or otherwise. The platen 25 turns anti-clockwise, and a blank leaving the receiving station in one of the elements 37 arrives in a punching station (one o'clock position in Fig. 1) where it is acted upon, as shown in Fig. 22 by the punch 42. The partly formed rivet leaving the punching station arrives in a bore-trueing station (twelve o'clock position in Fig. 1) where it is acted upon by the drift 43. The finished rivet (86, Fig. 24) requires to be lifted out of the die in which it was formed, prior to the receipt, by that die, of a fresh blank at the blank-receiving station. In Fig. 1 the ten o'clock die position is the rivet-lifting station.

Finished rivets may be lifted out of the female die elements in any one of several ways (they may even be hooked out manually); for preference, however, they are lifted clear of the particular die (37) by the lifting rod 44. This rod 44 is slidable in a hole in the bolster ring 33. This hole is so positioned that it registers with the bottom of the cavity 38 of any one of the female dies emplaced in the rivet lifting station. The rod 44 has a pilot stem 87 (Fig. 12), which is able freely to enter the bore of a rivet. The rod is fixed upon a plunger 88 freely slidable in a sleeve bearing 89 in the base block 28. The plunger 88 is fixed on bracket 72 as indicated at 90.

By reason of rod 44 being fixed relative to the punch-head, it follows that during normal operation, a finished rivet is lifted out of a female die at the lifting station, every time the punch-head approaches the top end of its upstroke. The rivets so lifted, may be picked off the rod 44 manually or otherwise. For preference rivet transfer mechanism as follows is employed.

The punch-head has a post 91 fixed thereon. This post is closely similar to that numbered 59 and is similarly slidable within a ring-bracket 92, a collar 93 to which the bracket 92 is fixed, and a bush 94 (Fig. 4) in a hole in the base-block 28. The bracket and collar assembly 92—93 is freely rotatable about the post 91 and is restrained against axial movement by a ring-bearing 95. The collar 93 carries a radial pin 96 for a freely revoluble follower roller 97 which rides within a cam-groove in the post 91. This groove consists of a straight bottom portion 98, a central inclined or helical portion 99 and a flared portion 100. The ring-bracket 92 is provided with a tension spring 101 to restrain backlash movements thereof. The spring 101 rides in a peripheral groove 102, is anchored to the bracket 92 at 103, and to the ring-bearing 95 at 104.

The bracket 92 has an integral or affixed arm 105 thereon. A pair of rivet gripping levers 106 are fulcrumed on the arm 105 at 107 (Fig. 11). Pegs 108, on the levers, and pegs 109, on the arm 105, are connected by tension springs 110. These springs influence mutual approach of the rivet-holding jaws 111 of levers 106. A stop 112 prevents too close approach of said jaws. These jaws have rounded or cutaway undersides as shown at 113.

When the punch-head is in approximately the top one third part of its movement range, the follower roller 97 is within the groove portion 98, and hence the arm 105 is in the position shown in Figs. 6 and 7; that is with the jaws 111 lying directly above the rivet lifting station. When the punch-head is nearly at the top of its upstroke, the rod 44 commences to lift a rivet at the lifting station (Fig. 12) and then thrusts it between the rounded jaws 111 into the position shown in Figs. 7 and 13. As the punch-head commences descent, the rod 44 leaves the rivet, which remains held by the jaws 111. Shortly after, the roller 97 enters the cam-groove portion 99, and the arm 105 is thereby swung into the position shown in Fig. 1. In this position the transferred rivet is poised directly above a small pedestal 114 fixed on the base-block 28. Pedestal 114 (see mainly Figs. 7 to 10) has a bore 115 into which the body of a rivet may freely enter. During continued descent of the punch-head, the bore of the rivet, over pedestal 114, is entered by a pilot stem 116 (see Fig. 9). Meanwhile, the follower roller 97 (due to the influence of spring 101) rides against the upright side 117 of the cam-groove portion 100 and therefore, for the time being, the rivet is held stationary above the pedestal 114.

The pilot stem 116 extends from a shoulder 118 on the body of a pin 119 which is slidable in a sleeve 120 fixed to the punch-head 41. The diameter of the bore of sleeve 120 is such that a rivet head may neatly but tightly enter thereinto (as shown in Fig. 10). A push-rod 121 bears on the top of pin 119. This push-rod is slidable in the punch-head 41, and has a groove 122 which is engageable by a ball 123 loaded by compression spring 124. Directly above push-rod 121 there is a stationary abutment 125, which is conveniently fixed to a stationary part of the machine.

The pilot stem 116 is a firm fit within the rivet bore, and as soon as said stem is homed within said bore (as shown in Fig. 9) the arm 105 is contacted by the work edge 126 of a cam plate 127 fixed to the punch-head. Continued descent of the punch-head, causes the cam 127 to displace the arm 105 sidewardly so that the jaws relinquish their grasp on the rivet in opposition to the loading of springs 110. During the sideward displacement of arm 105, the punch-head has continued to descend, although the rivet has been prevented from descending while still engaged by jaws 106. This causes a momentary halting of the pin 119, which is allowed for, by the ability of the head 128 of pin 119 to rise within the cavity 129 (Fig. 9) thus raising the push-rod 121 against the loading effect of ball 123 and spring 124. As soon as the jaws 106 are clear of the rivet it is emplaced in the top of pedestal 114, as shown in Figs. 8 and 10, with the lower end of sleeve 120 firmly engaged about the rivet head. (At this point it may be noted that during the sideward displacement of the arm 105, the roller 97 is in the flared portion 100 of the cam-groove. The width of the portion 100 enables the said sideward displacement and the spring 101 yieldingly opposes it.)

The position of the sleeve 120, shown in Figs. 8 and 10, corresponds with the bottom end of the punch-head downstroke. From this point, the sleeve 120 commences to rise with the rivet firmly gripped therein by its head. In addition to lifting the rivet from the pedestal, the sleeve 120 also functions as a shear whereby ragged edges or burrs on the periphery of the rivet head are sheared off as the sleeve engages the rivet head as shown in Fig. 10.

As the punch-head rises, the roller 97 engages in the groove portion 99, and the arm 105 is again swung over the platen in readiness for reception of a next rivet at the lifting station. As the punch-head nears the top of its upstroke, the push-rod 121 is depressed by the abutment 125 so that these parts assume the positions shown in Fig. 7, and the rivet 86 being disengaged from the sleeve 120 freely falls from the pilot stem of pin 119. The falling rivet may be directed as desired, by an air blast, in known manner. An air blast nozzle is indicated at 130 (Fig. 7).

The use of the sleeve 120 as a rivet-head trimming shear, results in small shavings and ragged burr pieces being shed about the vicinity of the pedestal 114. It is the tendency of these small waste pieces to lodge on the platen flange 34 which largely establishes need for a notch-cleaning chisel such as 83. Most of the small waste pieces are cleared from the vicinity of pedestal 114 by partly surrounding that integer with an upstanding wall 131, and by the provision of an air nozzle 132 (Fig. 1) the blast of which sweeps round the interior of wall 131 and clears unwanted matters therefrom.

As previously noted herein, washer-like rivet blanks such as 45 (Fig. 21) may be fed into the female die cavities 38 arriving and halting at a selected blank-receiving station, in any one of several different ways. For example, the blanks may be manually emplaced in the dies, or they may be arranged as an upright column within a tubular feeding magazine, the open bottom end of which is located directly above the receiving station. Again, the blanks may slide towards and into the receiving station by way of a chute or the like. It will also be appreciated that blanks such as 45 may be made in many different ways.

In the illustrated embodiment of the invention, the required blanks are made in a follow-die, from strip stock; and said die is combined with the mechanism already described herein, in such manner that the rate of blank production by said follow-die is exactly equal to the required rate of blank intake by the female die elements 37, and a portion of the follow die assembly is instrumental in emplacing the blanks in female die elements halted at the receiving station.

Referring mainly to Figs. 14 and 15, the follow-die comprises a main-plate 133 having a groove in its upper face. This groove consists of a wide portion 134 and a narrow portion 135 as shown in Fig. 14. The main-plate 133 is fixed on a block 136 which in turn is fixed on the base-block 28. The arrangement is such that the groove is directed towards the axis of the platen, and (in plan) the longitudinal centre line of the groove portion 135 radially intersects the pitch circle 39 at the blank receiving station as will be apparent from Fig. 1. The groove 134-135 together with a roof-plate 137 constitutes an infeed channel for strip stock 138. While in this channel, the stock is acted upon by a chisel-punch 139, a drill-punch 140, a blanking-punch 141, and a shear-punch 142. These four punches are fixed on the punch-head 41, respectively in register with the die-holes 143, 144, 145 and 146. The axis of die-hole 145 coincides with the axis of any one of the female dies 37 which happens to be at the receiving station. The die-hole 146 has an air-blast pipe 147 open to one end thereof, and a scrap departure-chute 148 (see Fig. 1) open to the other end thereof.

In operation, a stock strip 138 is inserted into the follow die in the direction indicated by arrow in Fig. 14. The width of the stock is greater than that of the groove portion 135 and consequently the side 149 of hole 143 halts the strip 138. Descent of the punch-head causes the punch 139 to remove an edge portion from the strip as indicated at 150 (Fig. 17). The narrowed portion of the stock is able to enter the groove portion 135, consequently provided endwise pressure in the direction of the arrow in Fig. 14, is maintained, the strip intermittently feeds into the follow-die, by an amount equal to the length of hole 143, on each occasion that the punch 139 recedes from said hole. The narrowed strip is then holed by punch 140 as indicated at 151 (Fig. 18). When the holed strip arrives below punch 141, the pilot 152 of this punch loosely engages within the hole due to punch 140. The punch proper (141) then cuts a washer-like blank 45 (Fig. 21) from the strip, leaving a hole 153 (Fig. 19) therein. As the waste end portion 154 (Fig. 20) arrives in the hole 146 it is sheared off by punch 142 and is blown clear of the die by air blast from pipe 147 and by way of chute 148.

The length of punch 141 is such that after it has cut a washer-like blank, it thrusts it right through the main-plate 133 and emplaces it in the female die cavity 38, in the blank-receiving station, as shown in Fig. 15. As the platen rotates, the rivet is formed as shown in Figs. 22 and 23, and is subsequently lifted out of the platen dies by rod 44. The rivet is removed from rod 44 as previously described herein.

In the mechanism described herein, the platen has twelve female die elements and two rivet-forming punches. It will be readily appreciated that there may be more or less than twelve female-die elements provided the number is at least equal to the number of separate rivet-forming operations to be performed; also, that there may be only one rivet-forming punch or more than two thereof depending on the shape complexity or other characteristic of the rivet to be made. In this connection it may be noted that the machine subject hereof is useable in the manufacture of small objects which may bear some similarity of form to the rivet shown in Fig. 24 but are not necessarily "rivets" within the ordinary meaning of that term. In short, the invention subject hereof is called rivet-forming mechanism because it has been devised and designed primarily for that purpose, but its utilities are not necessarily confined to carrying that purpose into effect.

I claim:

1. In a machine for forming tubular rivets and the like and having a rotatable plate carrying a plurality of female die elements and a head adapted to be reciprocated perpendicularly to the plane of rotation of the plate and carrying a male punch, a mechanism actuated by said head to produce step-wise rotation of said plate comprising a support fixed to said head and provided with a cam groove, a ring-bracket slidably mounted on said post and restrained from axial movement, a member secured to said ring-bracket and extending into said cam groove, and a pawl member having one end rotatably secured to said ring-bracket and its other end adapted to selectively engage said notches.

2. In a machine for forming tubular rivets and the like and having a rotatable plate carrying a plurality of female die elements and a head adapted to be reciprocated perpendicularly to the plane of rotation of the plate and carrying a male punch, a mechanism for transfering the rivets from said die elements comprising a support fixed to said head and provided with a cam groove, a ring-bracket slidably mounted on said post and restrained from axial movement, a member secured to said ring-bracket and extending into said cam groove, an arm having one end fixedly secured to said ring-bracket, a pair of levers pivotedly secured to the other end of said arm and adapted to engage the rivets and resilient means acting on said levers.

3. In a machine for forming tubular rivets and the like and having a rotatable plate carrying a plurality of female die elements and a head adapted to be reciprocated perpendicularly to the plane of rotation of the plate, a mechanism for transferring the finished rivets from said die elements comprising a support fixed to said head and provided with a cam groove, a ring-bracket slidably mounted on said post and restrained against axial movement, a member secured to said ring-bracket and extending into said groove, an arm having one end fixedly secured to said ring-bracket, a pair of levers pivotedly secured to the other end of said arm and adapted to engage a rivet, and means for removing the rivets from between said arms, said means comprising a stationary member provided with a bore adapted to receive a rivet, a sleeve fixed to said head and provided with a bore in axial alignment with the bore in said member and aadpted to tightly embrace a rivet, a pin slidably mounted within the bore of said sleeve and movable between a lower position and an upper position, a pilot stem on the lower end of said pin and adapted to enter the bore of a rivet, resilient means including a push-rod to retain said pin in its lower position, and a stationary stop engaging said push-rod when the head is near the end of its movement from the plate.

EDWARD FRANS HESSELMAN.